US012731998B2

(12) United States Patent
Kumar et al.

(10) Patent No.: US 12,731,998 B2
(45) Date of Patent: Sep. 8, 2026

(54) METHOD AND CONTROLLER FOR CONTROLLING A POWER TRANSMISSION NETWORK

(71) Applicant: GE Infrastructure Technology LLC, Greenville, SC (US)

(72) Inventors: Amit Kumar, Stafford (GB); Omar Jasim, Stafford (GB); Damien Fonteyne, Stafford (GB)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 144 days.

(21) Appl. No.: 18/958,219

(22) Filed: Nov. 25, 2024

(65) Prior Publication Data

US 2025/0192563 A1 Jun. 12, 2025

(30) Foreign Application Priority Data

Dec. 11, 2023 (EP) .................................... 23215556

(51) Int. Cl.
*H02J 3/36* (2026.01)
*H02J 3/46* (2006.01)

(52) U.S. Cl.
CPC . *H02J 3/36* (2013.01); *H02J 3/46* (2013.01)

(58) Field of Classification Search
CPC ...... H02J 3/36; H02J 3/46; H02J 3/001; H02J 3/0073
USPC ............................................................ 363/35
See application file for complete search history.

(56) References Cited

U.S. PATENT DOCUMENTS 11,477,213 B2 * 10/2022 Pan .......................... H02J 3/001
2012/0026760 A1 * 2/2012 Juhlin ....................... H02J 3/36 363/35
2014/0092650 A1 * 4/2014 Alston ...................... H02J 3/36 363/35
2020/0395741 A1 * 12/2020 Broy ........................ H02B 1/20

FOREIGN PATENT DOCUMENTS

WO WO-2014044293 A1 * 3/2014 ................ H02J 3/36

OTHER PUBLICATIONS

Extended European Search Report issued in EP Application No. 23215556.4 dated May 29, 2024, 5 pages.

* cited by examiner

*Primary Examiner* — Yemane Mehari
(74) *Attorney, Agent, or Firm* — Eversheds Sutherland (US) LLP

(57) ABSTRACT

A method for controlling a converter station in a power transmission network. The method includes: initially controlling, by a controller, the power converter to transfer power between the AC network and the transmission network via the first branch and the second branch; detecting, by the controller, a fault in the second branch; in response to detecting the fault in the second branch: issuing, by the controller, a first command to reduce an AC side voltage of the power converter; issuing, by the controller, a second command to open the first switch, the third switch, and the fourth switch; in response to the fourth switch opening: issuing, by the controller, a third command to close the first switch; and issuing, by the controller, a fourth command to restore an AC side voltage of the power converter to an AC reference value.

15 Claims, 6 Drawing Sheets

METHOD AND CONTROLLER FOR CONTROLLING A POWER TRANSMISSION NETWORK

FIELD OF THE INVENTION

The present invention relates to a method and a controller for controlling a power transmission network, and more particularly for controlling a converter station in a power transmission network.

BACKGROUND

In high voltage direct current (HVDC) power transmission networks, alternating current (AC) power is typically converted to direct current (DC) power for transmission via overhead lines, under-sea cables and/or underground cables, also known as a transmission medium. This conversion removes a need to compensate for the AC reactive/capacitive load effects imposed by the power transmission medium, i.e., the transmission line or cable, and reduces the cost per kilometre of the lines and/or cables. The conversion tends to be beneficial, for example when power is transmitted over a long distance. DC power can also be transmitted directly from offshore wind parks to onshore AC power transmission networks, for instance.

The conversion between DC power and AC power is utilised where it is necessary to interconnect DC and AC power, for example between an AC grid and a HVDC transmission line. In power transmission networks, power conversion means, also known as power converters (i.e., power converters in converter stations, power electronics-based resources, power inverters etc.) are required at each interface or interconnection between AC and DC power to implement the required conversion from AC to DC or from DC to AC.

A HVDC transmission network will thus typically include a transmission medium with a power converter connected on either side of the transmission medium. The power converters are typically connected to AC networks via switchgears. The power converter and its respective switchgear may be referred to as a converter station. A typical HVDC transmission network will thus have two converter stations, one on either side of the transmission medium, interfacing the transmission medium to a respective AC network.

A fault may occur in one of the converter stations. A conventional method to manage the fault comprises isolating the fault by opening circuit breakers and/or disconnectors on both sides of the transmission medium. The transmission network or power system may then be restarted in a new configuration that accounts for the fault. The conventional approach tends to require considerable time to detect and isolate the fault, and restart the transmission network, during which time the transmission medium and the converter stations are out of service. This can be problematic for maintaining power stability in the transmission network or power system. The increased downtime also tends to reduce the cost-effectiveness of operating the transmission network.

SUMMARY OF THE INVENTION

In light of these considerations and emerging grid requirements, it is desired to develop methods that provide improved fault management of a fault in a transmission network.

According to a first aspect, there is provided a method for controlling a converter station in a power transmission network, the converter station comprising a first branch, a second branch, and a power converter. The first branch comprises a first switch in series with a first transformer in series with a second switch. The second branch comprises a third switch in series with a second transformer in series with a fourth switch. The first branch and the second branch are in parallel, the first and third switches are connected to an AC network, and the second and fourth switches are connected to an AC side of the power converter. The method comprises initially controlling, by a controller, the power converter to transfer power between the AC network and the transmission network via the first branch and the second branch. Detecting, by the controller, a fault in the second branch. In response to detecting the fault in the second branch: issuing, by the controller, a first command to reduce an AC side voltage of the power converter; and issuing, by the controller, a second command to open the first switch, the third switch, and the fourth switch. In response to the fourth switch opening: issuing, by the controller, a third command to close the first switch; and issuing, by the controller, a fourth command to restore an AC side voltage of the power converter to an AC reference value.

In other words, issuing the third and fourth commands causes the power converter to transfer power between the AC network and the transmission network via the first branch (only) and not via the second branch.

In some embodiments, the power converter further comprises a DC side that is connected to a power transmission medium. The method may further comprise issuing, by the controller, a DC voltage command to change or adjust a DC side voltage of the power converter to a DC reference value. This may be performed after the converter output voltage is clamped, i.e. before the switches are opened.

In some embodiments, detecting the fault in the second branch comprises detecting a fault between the third switch and the fourth switch.

In some embodiments, the fault comprises any one of: a break in an insulation in the second transformer, and/or an insulation failure in a component in the second branch; and/or an abnormal current flow through the converter station; and/or an abnormal current flow through the second branch; and/or an abnormal voltage in the converter station; and/or an abnormal voltage in the second branch; and/or a current path in the second branch that allows a current to flow from the power transmission network to a ground or Earth.

In some embodiments, the first command includes instructions to reduce an AC side voltage of the power converter to a first reference value; wherein the first reference value is zero, such that issuing the first command to reduce the AC side voltage of the power converter causes the AC side voltage of the power converter to converge to zero.

In some embodiments, the first command includes instructions to reduce an AC side voltage of the power converter to a first reference value; wherein the first reference value is a current opening capability of the fourth switch.

In some embodiments, the converter station is an asymmetrical monopole, or a bipole, or a symmetrical monopole HVDC transmission scheme, and initially controlling the power converter comprises initially controlling, by the controller, the power converter for the asymmetrical monopole, or the bipole, or the symmetrical monopole HVDC transmission scheme.

In some embodiments, the method is for controlling a power transmission network; the method further comprising, in response to the first switch closing: issuing, by the controller, a fifth command to the power transmission network, and/or to a windfarm controller, to transfer or connect wind-turbine feeders to the first AC network.

According to a second aspect, there is provided a controller for controlling a converter station in a power transmission network, the converter station comprising a first branch, a second branch, and a power converter; wherein the first branch comprises: a first switch in series with a first transformer in series with a second switch; wherein the second branch comprises: a third switch in series with a second transformer in series with a fourth switch; wherein the first branch and the second branch are in parallel, the first and third switches are connected to an AC network, and the second and fourth switches are connected to an AC side of the power converter. The controller is configured to initially control the power converter to transfer power between the AC network and the transmission network via the first branch and the second branch; detect a fault in the second branch; and in response to detecting the fault in the second branch: issue a first command to reduce an AC side voltage of the power converter; and issue a second command to open the first switch, the third switch, and the fourth switch. In response to the fourth switch opening, the controller is configured to: issue a third command to close the first switch; and issue a fourth command to restore an AC side voltage of the power converter to an AC reference value.

Generally, the controller tends to be configured to execute the methods described herein.

According to a third aspect, there is provided a converter station for a power transmission network, the converter station comprising: a first branch comprising: a first switch in series with a first transformer in series with a second switch; a second branch comprising: a third switch in series with a second transformer in series with a fourth switch; a power converter comprising an AC side and a DC side; and the controller of the second aspect configured to control the converter station. The first branch and the second branch are in parallel; the first and third switches are connected to an AC network; and the second and fourth switches are connected to the AC side of the power converter.

In some embodiments, the power converter is a Voltage Source Converter for providing power to a power transmission medium.

In some embodiments, the converter station is located onshore.

In some embodiments, the converter station is located offshore on a fixed platform.

In some embodiments, the converter station is located offshore on a floating platform.

In some embodiments, the first and third switches have higher current breaking capability compared to the second and fourth switches (216, 226).

In some embodiments, the first and third switches are circuit breakers. In some embodiments, the second and fourth switches are isolators or disconnectors.

According to a fourth aspect, there is provided an asymmetrical monopole or a symmetrical monopole HVDC transmission scheme comprising the converter station of the third aspect.

According to a fifth aspect, there is provided a power transmission network comprising an AC network; a HVDC power transmission medium; and the converter station of the third aspect. The converter station is connected between the AC network and the HVDC power transmission medium.

According to a sixth aspect, there is provided a computer program comprising instructions which when executed by a processor of a controller for controlling a power converter, cause the controller to perform the method of the first aspect.

According to a seventh aspect, there is provided a non-transitory computer-readable storage medium comprising the computer program of the sixth aspect.

It will be appreciated that particular features of different aspects of the invention share the technical effects and benefits of corresponding features of other aspects of the invention. More specifically, the controller, the converter station, the asymmetrical or symmetrical monopole HVDC transmission scheme, the power transmission network, the computer program, and the non-transitory computer-readable medium, share the technical effects and benefits of the method of the invention.

It will also be appreciated that the use of the terms "first" and "second", and the like, are merely intended to help distinguish between similar features and are not intended to indicate a relative importance of one feature over another, unless otherwise specified.

Within the scope of this application, it is expressly intended that the various aspects, embodiments, examples, and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible.

DETAILED DESCRIPTION

Figure 1:
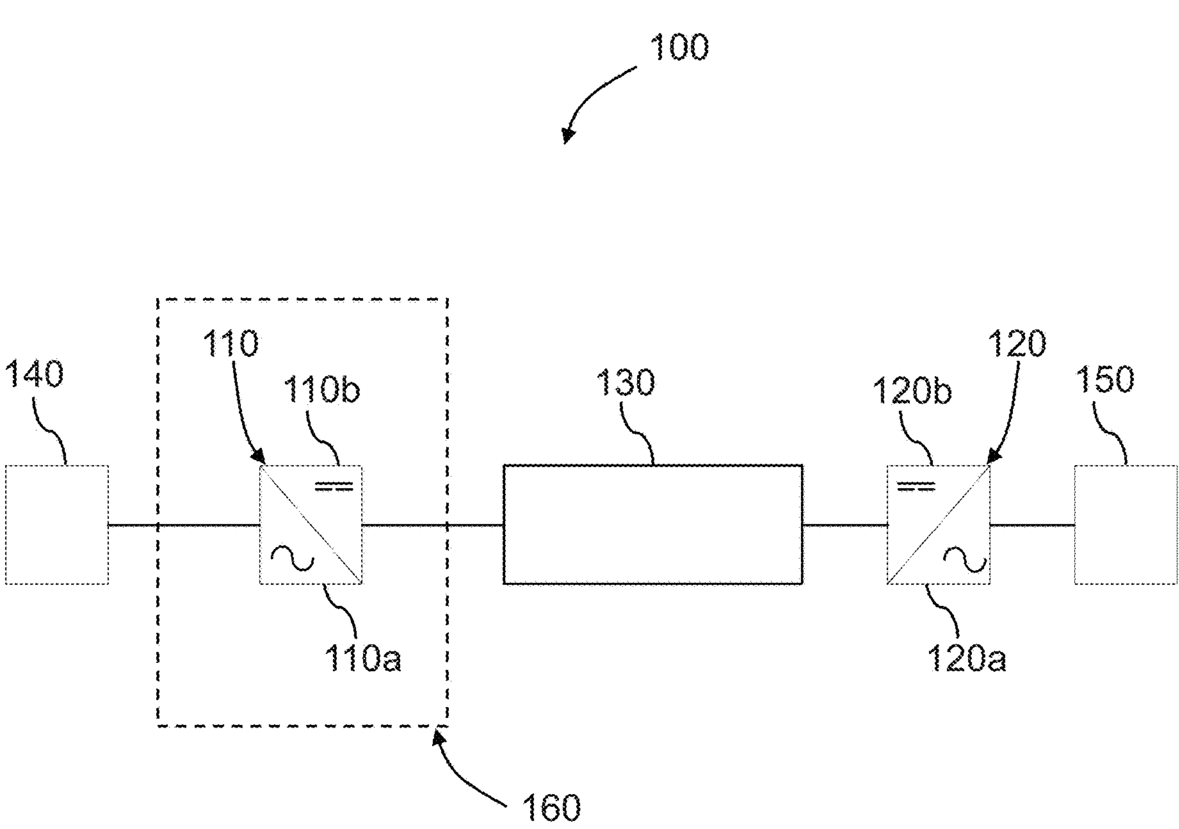
FIG. 1 is a schematic illustration of an example of a power transmission network including a converter station.

FIG. 1 illustrates generically, an example of a power transmission network 100. The illustration is not intended to be limited to representing a particular power transmission scheme, such as a monopole or bipole HVDC transmission network, but is moreover provided as a generic example illustrating principles of operation of a power transmission network that are useful for understanding the invention. In this manner, the power transmission network 100 may represent, generically, a monopole or bipole scheme, or may represent a multiterminal power transmission scheme, for instance. Hence whilst specific features in the illustration are shown connected to each other with a specific number of connections, it will be understood that this is not intended to be limiting either, but moreover to illustrate a generic connection between features/components. Related, is that relative dimensions or distances between components perceived in the illustration are also not intended to be limiting. It will therefore be understood that principles and features in the network 100 and herein discussed can be applied to networks comprising the controller 200 of FIG. 2, for instance; or networks controlled according to a method 400 of FIG. 4.

The power transmission network 100 includes a first power converter 110 (also known as a converter station, power electronics-based resource, inverter, inverter station, etc.), a second power converter 120, a transmission medium 130, a first AC network 140, a second AC network 150, and a converter station 160.

The power converters 110, 120, can convert AC power to DC power, acting essentially as rectifiers; or DC power to AC power, acting essentially as inverters. The power converters 110, 120 may each comprise a single converter in the case of a monopole system, or two converters in the case of a bipole system. The power converters 110, 120 may represent a plurality of converter stations arranged as a multi-terminal power transmission system. Generically, the first power converter 110 comprises a first AC side 110*a* and a first DC side 110*b*. Generically, the second power converter 120 comprises a second AC side 120*a* and a second DC side 120*b*.

The first power converter 110 is connected to a first AC network 140. The first AC network 140 is connected to the first AC side 110*a* of the first power converter 110. The second power converter 120 is connected to a second AC network 150. The second AC network 150 is connected to the second AC side 120*a* of the second power converter 120.

The first AC network 140 and/or second AC network 150 may be electrical power transmission systems comprising power generation apparatus, transmission apparatus, distribution apparatus, and electrical loads. The first AC network 140 and/or second AC network 150 may comprise a renewable power generation network such as a wind-power generation network, solar-power generation network, bio-power generation network. The first AC network 140 or second AC network 150 may be a consumer network. By way of non-limiting example, the first AC network 140 may be a power generation network, with second AC network 150 being a consumer network, for instance. In particular examples, the power converters 110, 120 may be geographically remote. For instance, the first power converter 110 may reside on an off-shore platform with a wind farm, and the second power converter 120 may reside on-shore.

The power transmission medium 130 connects the first power converter 110 and the second power converter 120. The power transmission medium 130 is connected between the first DC side 110*b* of the first power converter 110 and the second DC side 120*b* of the second power converter 120. The power transmission medium 130 may comprise electrical cables (or overhead lines) and other electrical components for connecting the first and second power converters 110, 120. For instance, the power transmission medium 130 may comprise a conductor providing a first electrical pole; and/or a conductor providing a second electrical pole. For bipole schemes, a neutral arrangement may also be provided interconnecting the first and second power converters 110, 120. The power transmission medium 130 provides the medium through which DC power is transferred between the power converters 110, 120.

The operation of the power transmission system 100 can be generically described as follows. The first AC network 140 generates AC power that is provided to the first power converter 110 at the first AC side 110*a*. The first power converter 110 converts the received AC power to DC power for transmission to the transmission medium 130. The DC power is transmitted from the first DC side 110*b* of the first power converter 110 to the transmission medium 130. The second DC side 120*b* of the second power converter 120 receives DC power from the transmission medium 130. The second power converter 120 converts the received DC power to AC power. The AC power is then provided from the second AC side 120*a* of the second power converter 120 to the second AC network 150 for consumption, for instance.

Additionally, in some circumstances, the first power converter 110 can also receive power from the transmission medium 130. The first power converter 110 can thus be configured to transfer real or reactive power in either direction, into or out of the first AC network 140. The second power converter 120 can also be configured to transfer real or reactive power in either direction, into or out of the second AC network 150.

It will be appreciated that various other electrical components may be located at any particular location or with any particular feature/component in the example 100. These may include power converter valves, switches, transformers, resistors, reactors, surge arrestors, harmonic filters and other components well known in the art.

It will be appreciated that converters or power conversion means may comprise a number of different technologies such as voltage sourced converters (for instance using insulated gate bipolar transistor (IGBT) valves). Such converters may generally be considered to use 'power electronics. Power electronic converters may comprise multi-level voltage sourced converters, for instance.

Moreover, it will be understood that the power transmission network 100 may be used with three-phase power systems. In a three-phase power system, three conductors supply respective first, second and third phases of AC power to a consumer. Each of the first, second and third phases will typically have equal magnitude voltages or currents, which are displaced in phase from each other by 120°.

The power transmission network 100 may further comprise a controller for controlling the operation of components of the power transmission network 100. For instance, a controller may be provided for executing the methods described herein. Such a controller may control the power converter 110, 120, for instance. Such a controller may be referred to as a controller means or control means. The controller may be the controller 200 of FIG. 2.

Figure 2:
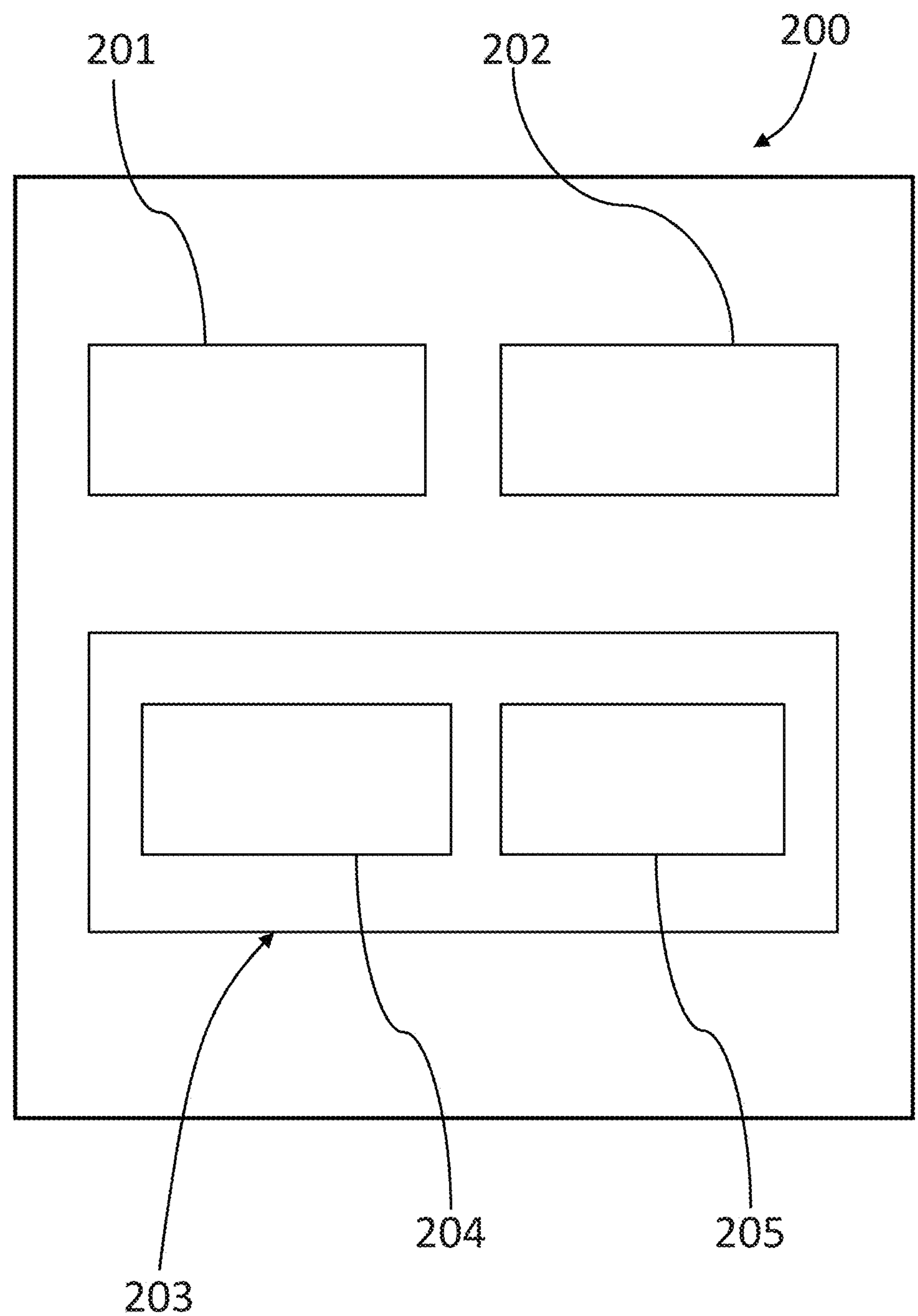
FIG. 2 shows an embodiment of a controller for controlling a converter station.

FIG. 2 illustrates an embodiment of a controller 200 as may be used in implementing the invention described herein.

The controller 200 comprises a memory 201 and at least one processor 202. The memory 201 comprises computer-readable instructions, which when executed by the at least one processor 202, cause the controller 200 to perform the method/s described herein.

The controller 200 is shown as comprising a transceiver arrangement 203 which may comprise a separate transmitter 204 and receiver 205. The transceiver arrangement 203 may be used to operatively communicate with other components or features of embodiments described herein either directly or via a further interface such as a network interface. The transceiver arrangement 203 may for instance send and receive control signals using transmitter 204 and receiver 205. The control signals may contain or define electrical control parameters such as reference currents or reference voltages.

The at least one processor 202 is capable of executing computer-readable instructions and/or performing logical operations. The at least one processor 202 may be a microcontroller, microprocessor, central processing unit (CPU), field programmable gate array (FPGA) or similar programmable controller. The controller may further comprise a user input device and/or output device. The processor 202 is communicatively coupled to the memory 201 and may in certain embodiments be coupled to the transceiver 203.

The memory 201 may be a computer readable storage medium. For instance, the memory 201 may include a non-volatile computer storage medium. For example, the memory 201 may include a hard disk drive, flash memory etc.

Whilst not shown, the controller 200 may additionally include a user input device interface and/or a user output device interface, which may allow for visual, audible or haptic inputs/outputs. Examples include interfaces to electronic displays, touchscreens, keyboards, mice, speakers and microphones.

Figure 3:
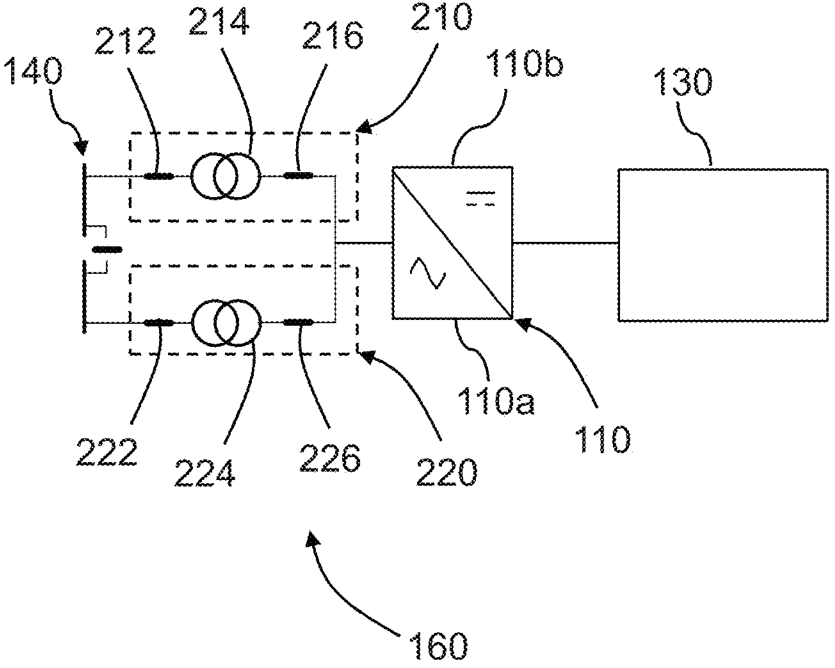
FIG. 3 is a schematic illustration of an example of a converter station in a first configuration.

FIG. 3 illustrates the converter station 160 in more detail. The converter station 160 comprises a first branch 210, a second branch 220, and the first power converter 110.

The first branch 210 comprises a first switch 212 in series with a first transformer 214 in series with a second switch 216. The second branch 220 comprises a third switch 222 in series with a second transformer 224 in series with a fourth switch 226. The first branch 210 and the second branch 220 are connected in parallel to the AC side 110*a* of the first power converter 110. The first and third switches 212, 222 are connected to the AC network 140. The second and fourth switches 216, 226 are connected to the AC side 110*a* of the first power converter 110. The DC side 110*b* of the first power converter 110 is connected to the power transmission medium 130.

The first and third switches 212, 222 may have current breaking capability, whereas the second and fourth switches 216, 226 may not have current breaking capability. Alternatively, the first and third switches 212, 222 may have higher current breaking capabilities compared to the second and fourth switches 216, 226. The first and third switches 212, 222 may be circuit breakers and the second and fourth switches 216, 226 may be circuit breakers having low current breaking capabilities or off-load switches such as isolators or disconnectors.

Although in this embodiment, the converter station 160 comprises the first power converter 110, it is to be understood that embodiments should not be limited in this way. For example, in other embodiments, a converter station may comprise the second power converter 120 instead of the first power converter 110.

The first transformer 214 and the second transformer 224 are conventional AC transformers. The first transformer 214 and the second transformer 224 have a primary side and a secondary side, and a turns ratio between the primary and secondary side. The turns ratio determines a ratio of voltage increase or decrease from the primary side to the second side, and/or vice versa.

A purpose of the first and second transformers is to step the voltage of the AC power from the AC network 140 to a suitable range to be received by the first power converter 110.

The first transformer 214 and the second transformer 224 may be variable transformers capable of having a variable turns ratio. The first and second transformers 214, 224 may be configured in any manner as required by a specific application.

The first transformer 214 and the second transformer 224 also provide electrical isolation from the AC network 140 to the power converter 110.

FIG. 3 shows a normal operation, discussed in more detail later below, wherein the first switch 212 and the second switch 216 are in a closed position, i.e., provide a short circuit, such that power can be transferred through the first switch 212 and the second switch 216. The third switch 222 and the fourth switch 226 are also in a closed position, i.e., provide a short circuit, such that power can be transferred through the third switch 222 and the fourth switch 226.

Figure 4:
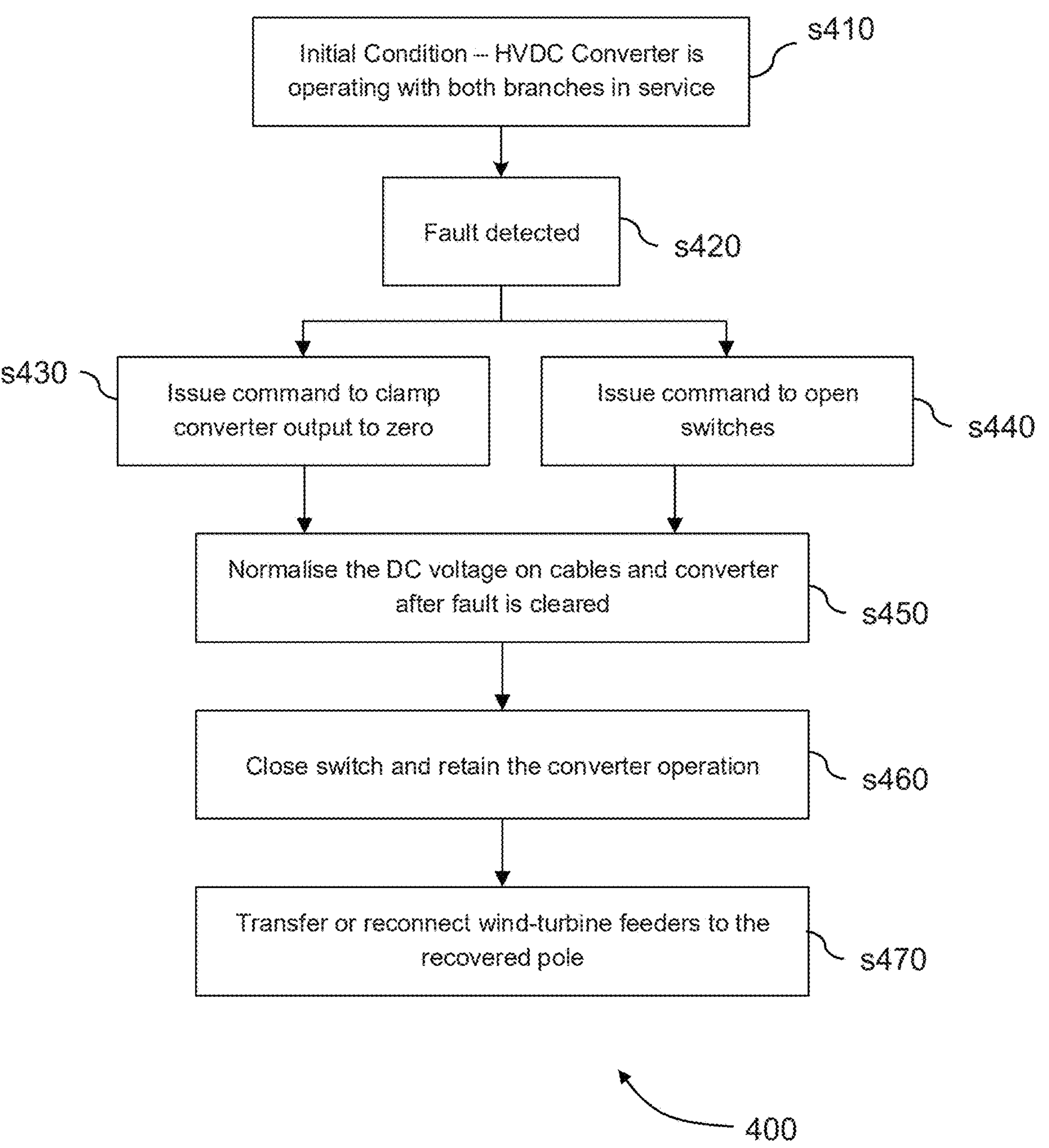
FIG. 4 shows an embodiment of a method for controlling a converter station and/or a power transmission network.

FIG. 4 shows an embodiment of a method 400 for controlling a converter station 160 and/or a power transmission network 100. At step s410, during a normal operation the first AC network 140 generates AC power. The AC power is transferred to the first AC side 110*a* of the first power converter 110 via the first branch 210 and the second branch 220. The first branch 210 and the second branch 220 are, from an operational perspective, identical, and therefore each branch may transfer a similar amount of power. However, in some examples, the first and second branches 210, 220 may be different, and as such the converter station 160 may be configured to transfer a different amount of power through the first branch 210 compared to the second branch 220. The specificity of the first and second branches 210, 220 may be application dependant.

During the normal operation, AC power is transferred from the AC network 140 to the first power converter 110, via the first and second branches 210, 220, with the first, second, third and fourth switches 212, 222, 216, 226 in the closed positions, and the transformers 214, 224 providing a suitable step-up or step-down of the AC voltage. The first power converter 110 converts the AC power to DC power that is transferred to the power transmission medium 130.

The first power converter 110 may also convert DC power from the power transmission medium 130 to AC power for the AC network 140. As such, the power converter 110 is initially controlled to transfer power between the AC network 140 and the transmission network 100 via the first branch 210 and the second branch 220.

Figure 5:
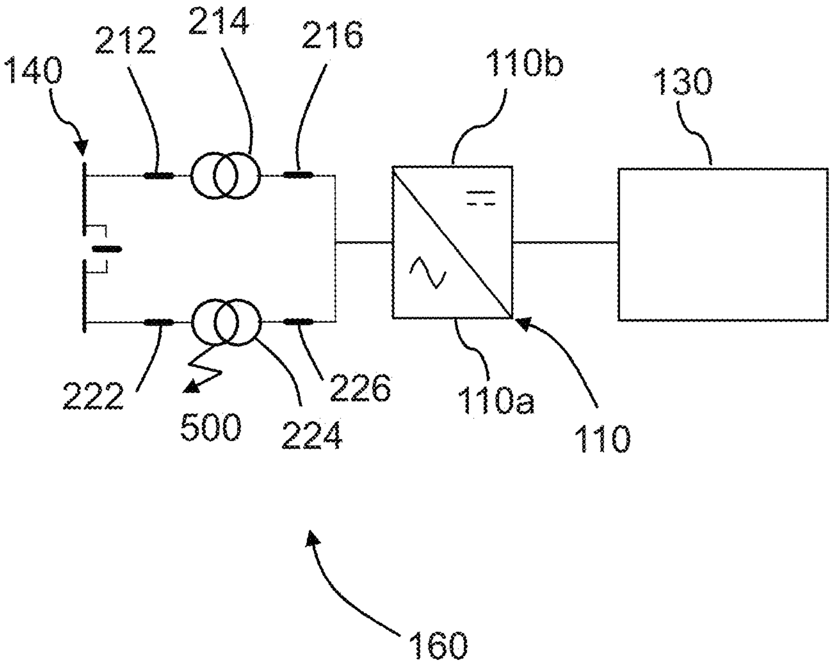
FIG. 5 is a schematic illustration of an example of a converter station in a fault condition.

With reference to FIG. 5, in this example, a fault 500 then occurs in the second branch 220, resulting in a fault condition. The fault 500 may be caused by, for example, a break in an insulation in the second transformer 224.

Generally, a fault may be understood to be anything that causes an abnormal current to flow through the converter station 160 or the second branch 220, or causes an abnormal voltage in the converter station 160 or the second branch 220. An abnormal current or voltage may be any current or voltage that is not expected during a normal operation of the converter station 160.

As a result of the fault 500, a current path is now present in the second branch 220 that allows a current to flow from the power transmission network 100 to, for example, a ground or Earth.

The fault 500 may cause a first fault current to travel from the first AC network 140 to the fault 500 via the first branch 210. The fault 500 may cause a second fault current to travel from the first AC network 140 to the fault 500 via the second branch 220. Additionally, a third fault current may travel from the transmission medium 130, via the first power converter 110, to the fault 500. There are thus three routes by which a fault current may be transferred out of the power transmission network 100 as a result of the fault 500.

A conventional method to manage the fault 500 tends to isolate the fault 500 by opening switches on both sides of the transmission medium 130. The power transmission network 100 may then be restarted in a new configuration that accounts for the fault 500. The conventional approach tends to require considerable time to detect the fault 500, and to isolate and restart the power transmission network 100, during which time the transmission medium 130 and the second power converter 120 are out of service. This can be problematic for maintaining voltage stability on the second AC network 150, considering reactive power requirements of the second AC network 150.

A benefit of controlling the converter station 160 according to the methods disclosed herein is that the second power converter 120 tends to continue transferring reactive power to the second AC network 150, even during the fault condition.

A further benefit is that the converter station 160 tends to be ready to resume transferring power from the first AC network 140 to the transmission medium 130 shortly after the fault has been detected and cleared or isolated by the switches. This is because the converter station 160 is reconfigured faster compared to conventional methods, because there is no need to shut down the transmission network 100 or to re-energise the transmission network 100 in a new configuration after the fault has been cleared or isolated. As such, the overall downtime of the power transmission network 100, as a result of the fault 500, tends to be less when compared with a conventional approach. These and other benefits tend to be realised when controlling the converter station 160 according to the methods disclosed herein, as will now be discussed.

With reference to FIG. 4, once the fault 500 has occurred, at a step s420, the controller 200 detects the fault 500 in the second branch 220. The controller 200 can detect the fault by, for example, measuring voltages and currents through a transducer installed in the first branch 210 and/or second branch 220 of the converter station 160, or by any other voltage or current sensing or measuring means. The fault 500 may be anywhere between the third switch 222 and the fourth switch 226.

At step s430, in response to detecting the fault 500 in the second branch 220, the controller 200 issues a first command to reduce an AC side 110*a* voltage of the power converter 110. This causes a reduction in the third fault current. The first command may be issued to the power converter 110 or another controller.

The first command may include instructions to reduce the AC side 110*a* voltage to a first reference value. The first reference value may be zero, such that the first command to reduce the AC side 110*a* voltage of the power converter 110 causes the third fault current transferred from the AC side 110*a* of the converter 110 to converge to zero. Alternatively, the first reference value may be a finite non-zero value, such that the first command to reduce the AC side 110*a* voltage of the power converter 110 causes the third fault current from the AC side 110*a* of the converter 110 to converge to a value below, for example, a current opening capability of the fourth switch 226.

In other words, the first command causes the power converter 110 to clamp the AC side 110*a* voltage to zero or to below the threshold value.

At step s440, also in response to detecting the fault 500 in the second branch 220, the controller 200 issues a second command to open the first switch 212, the third switch 222, and the fourth switch 226. The second command causes the first switch 212, the third switch 222, and the fourth switch 226 to break their respective connections, such that they are in open circuit configuration which prevents current from conducting through the first switch 212, the third switch 222, and the fourth switch 226. The second command may be issued to the first switch 212, the third switch 222, and the fourth switch 226 directly, or to another controller.

Figure 6:
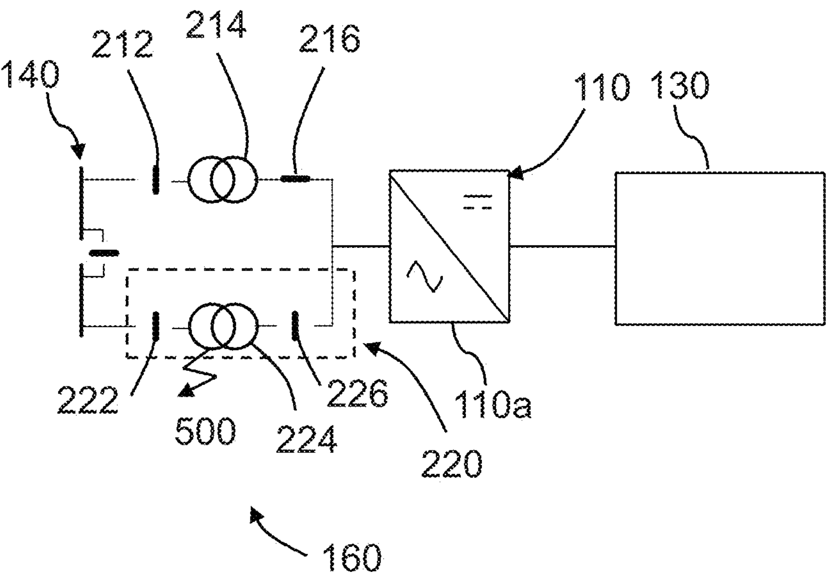
FIG. 6 is a schematic illustration of an example of a converter station in a second configuration.

By opening the first switch 212, the third switch 222, and the fourth switch 226, any path or route by which current may be transferred out of the power transmission network 100 as a result of the fault 500 has been removed, disconnected, or broken, and as such the second transformer 224 (including the fault 500) is isolated from the power transmission network 100, as shown in FIG. 6.

As a result of the first and second commands, the voltage of the transmission medium 130 may have become temporarily unstable or may have been temporarily interrupted. As such, the method 400 may further comprise, at step s450, the controller 200 issuing a DC voltage command to change or adjust the DC side 110*b* voltage of the power converter 110 to a DC reference value. The DC voltage command may be issued to the first power converter 110, and/or to the second power converter 120, and/or to another controller. The DC reference value may be a nominal operating DC voltage of the transmission medium 130. This may be, for example, 320 kV or 525 kV.

A purpose of the DC voltage command is to normalise the DC voltage on the transmission medium 130 after the fault 500 has been isolated. By normalising the DC voltage on the transmission medium 130, the power transmission network 100 may be restored to a normal operation, wherein real and reactive power may flow between first and/or second power converters 110 and 120.

Figure 7:
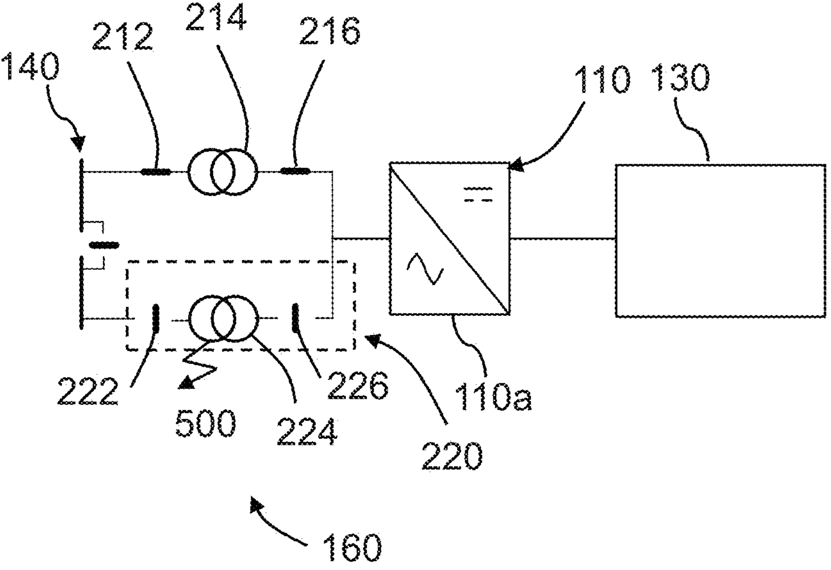
FIG. 7 is a schematic illustration of an example of a converter station in a third configuration.

At step s460, in response to the fourth switch 226 opening, the controller 200 then issues a third command to close the first switch 212 (i.e., return the first switch 212 to a conducting state), and also issues a fourth command to restore an AC side 110*a* voltage of the power converter 110 to an AC reference value. The AC reference value may be a value of, or a value close to, the AC side 110*a* voltage before the fault condition, for example the value of the AC side 110*a* voltage in step s410. As a result of issuing the third and fourth commands, the first branch 210 is able to transfer power between the first AC grid 140 to the first power converter 110, as shown in FIG. 7. The third command may be issued to the first switch 212 or to another controller. The fourth command may be issued to the first power converter 110 or to another controller.

At step s470, once the first switch 212 has been closed, the controller 200 may issue a fifth command to transfer or connect wind-turbine feeders to the first AC network 140. As a result, the first AC network 140 can remain energised. The fifth command may be issued to the power transmission network 100, to a wind farm controller, or to another controller.

As a result of the above steps, the controller 200 has reconfigured the power converter 110 to transfer power between the AC network 140 and the power transmission medium 130 via the first branch 210 and not the second branch 220, such that the converter station 160 can transfer power from the first AC network 140 to the transmission medium 130 without the second branch 220.

In other words, the operation of the converter station 160 has been re-established in a new transformer configuration, which takes into account the fault 500 in the second transformer 224.

In this manner, the methods disclosed herein tend to allow the converter station 160 to transfer power between the first AC network 140 to the transmission medium 130, shortly after the fault 500 has been detected and cleared, which reduces the downtime of the power transmission network 100. This is because the fault 500 tends to be isolated faster, compared to conventional methods, because the fault 500 can be managed by controlling the converter station 160 only on one side of the transmission medium 130. Additionally, the methods disclosed herein tend not to need to re-energise the transmission network 100 and/or first AC network 140 after the fault 500 has been isolated, which further helps reduce any downtime of the power transmission network 100.

Conventional power schemes, where only switches with current breaking capability are available for use in the AC side of the power converter, for example when one side of the transmission medium is onshore and the other side is off-shore, tend to, in a fault scenario, block and trip the power converters on both sides (i.e., the on-shore and off-shore side) of the transmission medium. After isolating the fault, the scheme tends to require manual reconfiguration to use only the single non-faulty transformer, and a start-up sequence is initiated from the onshore side to energise the transmission network 100. This conventional approach is not a preferred way to operate such a scheme, because normally the onshore converter also provides reactive power support to the connected onshore AC network, and especially for the islanded conditions, the onshore converter forms part of the network. Hence, it is desirable to have uninterrupted operation of the onshore converter in such circumstances.

A further benefit of the methods disclosed herein is that the fault 500 tends to be isolated and managed by controlling the converter station 160 only on one side of the transmission medium 130. As such, the converter station on the other side of the transmission medium 130, for example a converter station comprising the second power converter 120, can continue to operate uninterrupted and provide reactive power support to the second AC network 150.

The methods disclosed herein tend to be particularly advantageous when operating a transmission scheme or power transmission network 100 wherein the first power converter 110 is located offshore, and the second power converter 120 is located onshore. The first power converter 110 may be, for example, located on a fixed or floating platform. In such circumstances, the converter station 160 can benefit from only using switches that do not require current breaking capability, which tend to be more space efficient and thus more cost effective, which is a high priority on a fixed or floating platform.

The disclosure is related to a method for controlling a power transmission scheme comprising a sending-end converter connected to at least two AC networks via two parallel transformers, each transformer connected to the AC network through a grid-side switch and to the converter through a converter-side switch, the method comprising: isolating the converter from the AC networks, upon detecting a fault in one of the transformer branches, by issuing a sixth command to open the two grid-side switches; clamping an AC voltage of the sending-end converter to zero; issuing a seventh command to open the converter-side switch associated with the faulty transformer branch for isolating the faulty transformer branch from the scheme; building up the AC voltage of the sending-end converter from zero to a nominal value; and issuing a eighth command to close the grid-side AC breaker associated with the healthy transformer to facilitate operation of the power transmission scheme with the healthy transformer in line.

The building up the AC voltage involves bringing the converter AC voltage directly to the nominal value or ramping up the AC voltage from zero to the nominal value at a pre-defined rate.

We claim:

1. A method for controlling a converter station in a power transmission network, the converter station comprising a first branch, a second branch, and a power converter; wherein the first branch comprises: a first switch in series with a first transformer in series with a second switch; wherein the second branch comprises: a third switch in series with a second transformer in series with a fourth switch; wherein the first branch and the second branch are in parallel, the first and third switches are connected to an AC network, and the second and fourth switches are connected to an AC side of the power converter; the method comprising:

initially controlling, by a controller, the power converter to transfer power between the AC network and the transmission network via the first branch and the second branch;

detecting, by the controller, a fault in the second branch;

in response to detecting the fault in the second branch:

issuing, by the controller, a first command to reduce an AC side voltage of the power converter;

issuing, by the controller, a second command to open the first switch, the third switch, and the fourth switch;

in response to the fourth switch opening:

issuing, by the controller, a third command to close the first switch; and issuing, by the controller, a fourth command to restore an AC side voltage of the power converter to an AC reference value.

2. The method of claim 1, wherein the power converter further comprises a DC side that is connected to a power transmission medium; the method further comprising:

issuing, by the controller, a DC voltage command to change or adjust a DC side voltage of the power converter to a DC reference value.

3. The method of claim 1, wherein detecting the fault in the second branch comprises detecting a fault between the third switch and the fourth switch.

4. The method of claim 1, wherein the fault comprises any one of:

a break in an insulation in the second transformer, and/or an insulation failure in a component in the second branch; and/or an abnormal current flow through the converter station; and/or an abnormal current flow through the second branch; and/or an abnormal voltage in the converter station; and/or an abnormal voltage in the second branch; and/or a current path in the second branch that allows a current to flow from the power transmission network to a ground or Earth.

5. The method of claim 1, wherein the first command includes instructions to reduce an AC side voltage of the power converter to a first reference value;

wherein the first reference value is zero, such that issuing the first command to reduce the AC side voltage of the power converter causes the AC side voltage of the power converter to converge to zero; or wherein the first reference value is a current opening capability of the fourth switch.

6. The method of claim 1, wherein the converter station is an asymmetrical monopole, or a bipole, or a symmetrical monopole HVDC transmission scheme, and initially controlling the power converter comprises initially controlling, by the controller, the power converter for the asymmetrical monopole, or the bipole, or the symmetrical monopole HVDC transmission scheme.

7. The method of claim 1, wherein the method is for controlling a power transmission network; the method further comprising:

in response to the first switch closing:

issuing, by the controller, a fifth command to the power transmission network, and/or to a windfarm controller, to transfer or connect wind-turbine feeders to the first AC network.

8. A controller for controlling a converter station in a power transmission network, the converter station comprising a first branch, a second branch, and a power converter; wherein the first branch comprises: a first switch in series with a first transformer in series with a second switch; wherein the second branch comprises: a third switch in series with a second transformer in series with a fourth switch; wherein the first branch and the second branch are in parallel, the first and third switches are connected to an AC network, and the second and fourth switches are connected to an AC side of the power converter; the controller configured to:

initially control the power converter to transfer power between the AC network and the transmission network via the first branch and the second branch;

detect a fault in the second branch;

in response to detecting the fault in the second branch:

issue a first command to reduce an AC side voltage of the power converter;

issue a second command to open the first switch, the third switch, and the fourth switch;

in response to the fourth switch opening:

issue a third command to close the first switch; and issue a fourth command to restore an AC side voltage of the power converter to an AC reference value.

9. A converter station for a power transmission network, the converter station comprising:

a first branch comprising: a first switch in series with a first transformer in series with a second switch;

a second branch comprising: a third switch in series with a second transformer in series with a fourth switch;

a power converter comprising an AC side and a DC side; and the controller of claim 8, configured to control the converter station;

wherein:

the first branch and the second branch are in parallel;

the first and third switches are connected to an AC network; and the second and fourth switches are connected to the AC side of the power converter.

10. The converter station of claim 9, wherein the power converter is a Voltage Source Converter for providing power to a power transmission medium.

11. The converter station of claim 9, wherein the converter station is located onshore.

12. The converter station of claim 9, wherein the converter station is located offshore on a fixed or floating platform.

13. The converter station of claim 9, wherein:

the first and third switches have higher current breaking capability compared to the second and fourth switches; and/or the first and third switches are circuit breakers and the second and fourth switches are isolators or disconnectors.

14. An asymmetrical monopole or a symmetrical monopole HVDC transmission scheme comprising the converter station of claim 9.

15. A power transmission network, comprising:

an AC network;

a HVDC power transmission medium; and the converter station of claim 9;

wherein the converter station is connected between the AC network and the HVDC power transmission medium.

* * * * *